Jan. 29, 1935.   W. D. SARGENT   1,989,465
COMPOSITE BRAKE DRUM STRUCTURE
Filed June 2, 1931
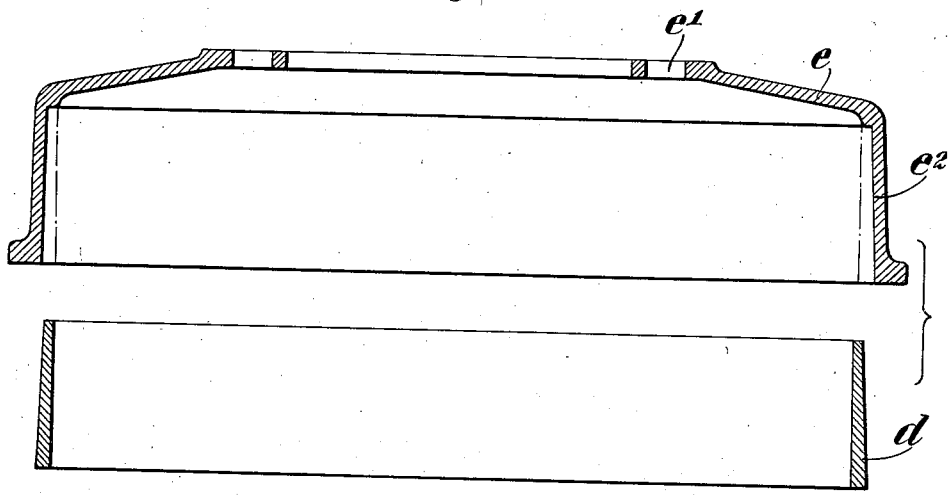
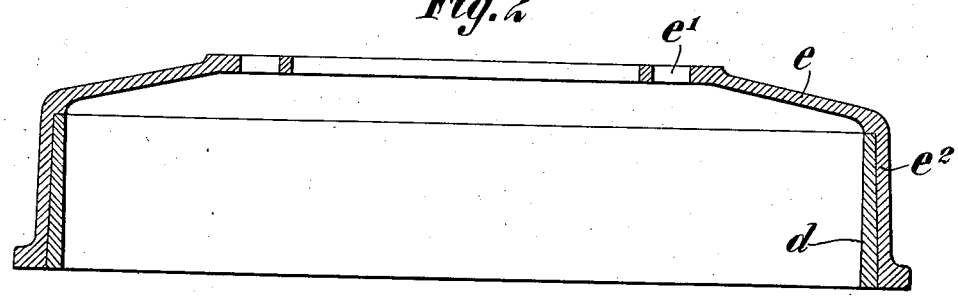
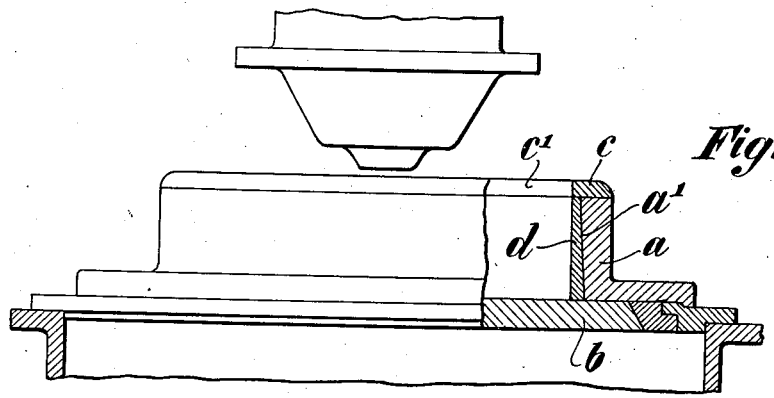
INVENTOR
William D. Sargent,
BY
Redding, Greeley, O'Shea & Campbell
HIS ATTORNEYS Patented Jan. 29, 1935

1,989,465

UNITED STATES PATENT OFFICE 1,989,465

COMPOSITE BRAKE DRUM STRUCTURE

William D. Sargent, New York, N. Y., assignor, by mesne assignments, to Durafer (Inc.), Dover, Del., a corporation of Delaware Application June 2, 1931, Serial No. 541,602

1 Claim. (Cl. 188—218).

This invention has for its general object to provide a brake drum structure which is inexpensive to manufacture, of longer life in use, and capable of inexpensive servicing by the replacement of the wear element.

In accomplishing the broad purposes of the invention advantage is taken of the characteristics, both internal and external, of centrifugally cast metal. For instance, a centrifugally cast annulus of iron can be formed in a permanent mould with internal and external surfaces of accurate predetermined dimensions, with an internal surface especially adapted for braking purposes in respect of both the coefficient of friction and wear resistance, and an external surface of such nature and hardness as to adapt it to the improved structure constituting the subject matter of this invention.

The annulus thus formed by centrifugal casting in a permanent mould is, internally, of homogeneous dense metal, the hardness of which increases from the inner surface to the outer surface as is desirable for the practice of the present invention. With a liner of such properties it becomes possible to form a composite structure suitable for the purpose by shrinking onto the exterior of the liner a suitable carrier shell of cast steel, malleable iron or pressed steel. Such a shell has such a coefficient of expansion as to enable it to be shrunk onto such a liner and is relatively softer than the surface of such a liner thereby permitting a relatively inexpensive composite structure to be formed pursuant to the method of assembly, and with a permanent union which is likewise simple and inexpensive and results in a finished product. A further advantage of the composite structure thus formed in accordance with the improved method is that the liner, being united with the shell by shrinking the shell onto the liner may be removed for replacement without injuring the shell which may then be shrunk onto a new liner for continued service. Still another advantage of the union described arises in use in that the minute irregularities on the surface of the liner, commonly referred to in the trade as "asperities" provide a myriad of air spaces which interrupt heat conduction from the ring to the shell.

In accordance with the improved method a liner, preferably tapered exteriorly, is cast centrifugally in a permanent mould, the exterior surface taking the dimensions and truly circular form of the mould. The steel shell which has previously been formed with an interior surface complementary to the exterior surface of the liner but of slightly less diameter, is then heated to expand it sufficiently to receive the liner, the subsequent shrinkage upon cooling of the shell, effecting a firm union between the shell and liner adapting the composite structure for use as a brake drum.

The invention will be described in greater detail in connection with the accompanying drawing, in which:

Figure 1 is a view in section through a steel shell and centrifugally cast iron liner showing the relation of parts before the shell is pressed onto the liner.

Figure 2 is a sectional view showing the composite brake drum after the shell is shrunk onto the liner.

Figure 3 is a somewhat diagrammatic view partly in section and partly in elevation showing a liner for the composite brake drum in position within a permanent mould after being centrifugally cast therein.

By way of example there has been illustrated in Figure 3 a permanent mould $a$ of a centrifugal casting machine having true circular walls $a'$ of predetermined diameter illustrated as slightly tapered for reasons which will later appear. The iron cast within the mould is confined between a bottom plate $b$ and a top flange $c$, the width of the latter determining the radial dimension of the tapered liner $d$ at the top edge, excess metal being discharged through the opening $c'$ within the ring $c$ in accordance with one known practice of centrifugally casting an annulus. The invention is not concerned with the method of casting the liner centrifugally except that the machines shall be such as to produce a liner of predetermined exterior and interior form and dimensions so that it may be used without further finishing except possibly slight grinding where desired. The liner thus formed of cast iron will have an internal surface especially well adapted for braking purposes by reason of its coefficient of friction and its resistance to abrasion. The metal within the liner will form a homogeneous structure throughout, being slightly denser at the exterior because of the added pressure from centrifugal force during the casting operation. The exterior surface is hard and regular while presenting minute irregularities which have considerable functional value in carrying out the invention.

The shell $e$, illustrated in Figure 1, may be of cast steel, malleable iron or pressed steel and while shown as provided with bolt holes $e'$ for attachment, for instance, to a wheel, it will be evident that the invention may be carried out with any shell structure whether integral with some other parts such as a wheel or separate therefrom. In practice, a pressed steel shell may be used to advantage in which case the circular interior of the shell will be formed of finished shape and dimensions without further operations, except possibly for a slight grinding. It is preferred that the circular portion $e^2$ of the shell which is to receive the liner $d$ shall be tapered slightly so that its form is complementary to the exterior of the liner. The diameter of the circular section $e^2$ will be slightly less than the external diameter of the liner $d$.

After forming the steel shell and liner as described, the next step in the method is to unite them. In accomplishing a firm union it is recognized that the shell will be softer than the contacting surface of the liner, which when centrifugally cast is relatively hard. The union of the two parts is effected by heating the shell to such an extent as to cause its expansion to a point where its diameter is greater than the external diameter of the liner. For instance, the diameter of the shell may be $\frac{1}{32}$ of an inch smaller than the outer diameter of the liner; the shell may be heated to a temperature of say 800° which may result in an expansion of 3/64 of an inch thereby making it 1/64 of an inch greater in diameter than the liner. The shell is then pressed over the liner and allowed to cool. The shrinkage will bring about an intimate and firm union without the use of any securing means. The composite structure is illustrated in Figure 2. The relatively soft metal of the shell grips the hard surface of the liner in which are the "asperities" with such force that relative movement, within all practical limits, of the units is positively prevented. The myriad of air spaces within the "asperities" constitute effective insulation, however, between the elements, reducing the conduction of heat from the liner to the shell, incidental to braking.

The method and resulting structure are simple and inexpensive involving under some conditions of production no machining or other finishing operations at all as to either the shell or the liner. However, as pointed out under some circumstances it may be advisable to grind the circular section $e^2$ of the shell and possibly the interior surface of the liner $d$.

In servicing, a composite brake drum as described will be highly satisfactory because of the braking characteristics of the centrifugally cast metal and its long life. The weight of the centrifugally cast liner may be only 25% of the weight of known cast iron drums and the weight of the composite structure may be as much as ⅓ less than the weight of the present cast iron drums, without sacrifice of the strength, wearing qualities or braking efficiency.

It will be evident that when the liner requires replacement it may be cut out from the shell without injuring the latter and a new liner united with the shell in the manner described hereinbefore. The operation will require only a short time and the expense involved as to both material and labor will be greatly reduced as compared to present day practice.

Changes in details are to be considered within the scope of the invention as defined by the appended claim.

What I claim is:

A composite brake drum structure comprising a steel shell having a circular tapered flange section and a centrifugally cast iron liner having an unfinished hard chilled external surface similar in form to the internal section of the shell, the shell being shrunk around the liner and united therewith solely by the friction of the unfinished external centrifugally cast surface of the liner and the interior surface of the shell.

WILLIAM D. SARGENT.